(12) United States Patent
Zhang et al.

(10) Patent No.: US 11,273,456 B2
(45) Date of Patent: Mar. 15, 2022

(54) FLOW PASSAGE SWITCHING DEVICE AND WATER OUTLET DEVICE

(71) Applicant: Xiamen Solex High-Tech Industries Co., Ltd., Xiamen (CN)

(72) Inventors: Lian Zhang, Xiamen (CN); Wenxing Chen, Xiamen (CN); Yijian Lin, Xiamen (CN)

(73) Assignee: Xiamen Solex High-Tech Industries Co., Ltd., Xiamen (CN)

(*) Notice: Subject to any disclaimer, the term of this patent is extended or adjusted under 35 U.S.C. 154(b) by 215 days.

(21) Appl. No.: 16/527,749

(22) Filed: Jul. 31, 2019

(65) Prior Publication Data
US 2020/0197961 A1 Jun. 25, 2020

(30) Foreign Application Priority Data

Dec. 21, 2018 (CN) .......................... 201811570994.5

(51) Int. Cl.
| | |
|---|---|
| *B05B 1/16* | (2006.01) |
| *B05B 1/18* | (2006.01) |
| *F16K 11/085* | (2006.01) |
| *F16K 31/60* | (2006.01) |
| *F16K 27/06* | (2006.01) |

(52) U.S. Cl.
CPC ............ *B05B 1/1636* (2013.01); *B05B 1/169* (2013.01); *B05B 1/185* (2013.01); *F16K 11/085* (2013.01); *F16K 11/0856* (2013.01); *F16K 27/065* (2013.01); *F16K 31/602* (2013.01)

(58) Field of Classification Search
CPC ..... B05B 1/1636; B05B 1/185; F16K 11/085; F16K 11/0856; F16K 27/065; F16K 31/602; Y10T 137/86871
See application file for complete search history.

(56) References Cited

U.S. PATENT DOCUMENTS

| | | | | |
|---|---|---|---|---|
| 4,355,659 A | * | 10/1982 | Kelchner | ............ F16K 11/0856 137/597 |
| 6,308,739 B1 | * | 10/2001 | Barbuto | ................ F16K 5/0478 137/625.11 |
| 8,602,058 B1 | * | 12/2013 | Del Castillo | ....... A61M 39/223 137/625.47 |
| 2003/0121553 A1 | * | 7/2003 | Kuo Liao | ............. F16K 11/076 137/625.47 |
| 2007/0044856 A1 | * | 3/2007 | Bonior | ................ F16K 11/0856 137/625.47 |
| 2011/0272049 A1 | * | 11/2011 | Jorgensen | ........... F16K 11/0856 137/625.47 |

(Continued)

*Primary Examiner* — Kevin R Barss
(74) *Attorney, Agent, or Firm* — Cooper Legal Group, LLC

(57) ABSTRACT

The present invention discloses a flow passage switching device and a water outlet device. The water outlet device comprises a flow passage switching device, a hand-held shower and a head shower. The switching device comprises a valve member and a switching shaft. The switching shaft is disposed in the valve member and rotatable relative to the valve member. The valve member is provided with an inflow passage and at least three outflow passages. The at least three outflow passages can be coupled with the inflow passage by selective switching of the switching shaft. The head shower is provided with at least two water outlet units, and the hand-held shower and the at least two water outlet units are respectively connected to the at least three outflow passages.

14 Claims, 14 Drawing Sheets

(56) References Cited

U.S. PATENT DOCUMENTS

2012/0012215 A1* 1/2012 Lee ................... F16K 11/0856
　　　　　　　　　　　　　　　　　　　137/861
2013/0263949 A1* 10/2013 Bartnick ............ F16K 11/0856
　　　　　　　　　　　　　　　　　　　137/625

* cited by examiner

FLOW PASSAGE SWITCHING DEVICE AND WATER OUTLET DEVICE

RELATED APPLICATION

This application claims priority to Chinese Patent Application 201811570994.5, filed on Dec. 21, 2018, which is incorporated herein by reference.

FIELD OF THE INVENTION

The present invention relates to the field of bathroom fixtures, particularly, the present invention relates to a flow passage switching device and a water outlet device.

BACKGROUND OF THE INVENTION

Existing flow passage switching devices comprise a valve member and a switching shaft which is installed in the valve member and rotatable relative to the valve member. The valve member is provided with an inflow passage and at least two outflow passages. Each outflow passage is provided with a water outlet hole. The switching shaft is provided with a water dividing chamber that is connected to the inflow passage. The switching shaft is provided with a water dividing hole that penetrates the switching shaft. Through rotation of the switching shaft, the water outlet holes of the at least two outflow passage are respectively switched to be connected with the water dividing hole to achieve flow passage switching. The water dividing hole should cooperate with the water outlet holes of all the outflow passages, which limits a layout of the outflow passages, leads to a complex structure, and occupies a large amount of space. For example, in an existing technical solution, the switching shaft is provided with two water dividing holes. The two water dividing holes are circumferentially arranged around the axis of the switching shaft and are spaced at intervals, and each of the outflow passages is provided with two water outlet holes that are circumferentially arranged around the axis of the switching shaft at intervals in the same way. The two water dividing holes respectively cooperate with the two water outlet. In fact, in the technical solution, each water dividing hole is in cooperation with each water outlet hole of all the outflow passages, and the layout of the outflow passage remains limited, which leads to a complex structure and a large amount of space is occupied.

SUMMARY OF THE INVENTION

The present invention provides a flow passage switching device and a water outlet device, which overcome the shortcomings of the flow passage switching device in the existing techniques.

In order to solve the technical problems, one of the technical solutions of the present invention is as below:

A flow passage switching device comprises a valve member and a switching shaft. The switching shaft is disposed in the valve member and rotatable relative to the valve member, and the valve member is provided with an inflow passage, at least one first outflow passage and at least one second outflow passage. The switching shaft is provided with a water dividing chamber connected to the inflow passage. The switching shaft is provided with at least one first water dividing hole and at least one second water dividing hole that penetrate the switching shaft. The at least one first water dividing hole is coupled with the at least one first outflow passage and the at least one second water dividing hole is coupled with the at least one second outflow passage. In a projection along a rotational axis of the switching shaft, the at least one first water dividing hole and the at least one second water dividing hole are circumferentially arranged around the rotational axis of the switching shaft, and in a projection perpendicular to the rotational axis of the switching shaft, the at least one first water dividing hole and the at least one second water dividing hole are arranged in the direction of the rotational axis of the switching shaft.

In a preferred embodiment, in the projection along the rotational axis of the switching shaft, the at least one first water dividing hole and the at least one second water dividing hole are circumferentially arranged around the rotational axis of the switching shaft at intervals.

In a preferred embodiment, in the projection perpendicular to the rotational axis of the switching shaft, the at least one first water dividing hole and the at least one second water dividing hole are arranged in the direction of the rotational axis of the switching shaft at intervals.

In a preferred embodiment, the valve member is provided with at least two of the first outflow passages, and the at least one first water dividing hole is coupled with the at least two of the first outflow passages.

In a preferred embodiment, the flow passage switching device further comprises an operating member, wherein the switching shaft is drivably coupled with the operating member.

In a preferred embodiment, the valve member comprises a valve body and a valve cover, and the valve body is provided with an inwardly extending mounting chamber. The valve cover is fixed to an opening of the mounting chamber such that the valve cover is sealed to the mounting chamber, and an end surface of a first end of the switching shaft provided with an inwardly extending groove, which forms the water dividing chamber. The switching shaft is mounted in the mounting chamber, and an opening of the groove faces the same direction as the opening of the mounting chamber. The inflow passage comprises a water chamber and a water passage, the water chamber is formed between the end surface of the first end of the switching shaft and the valve cover, and the water passage is disposed in the valve body and is used to introduce water from outside of the valve body into the water chamber.

In a preferred embodiment, the opening of the mounting chamber is provided with an enlarged hole, which forms a step surface. An outer edge of the first end of the switching shaft outwardly extends to form an annular convex portion, and the annular convex portion abuts the step surface.

In a preferred embodiment, an end opening of the water passage is located on the step surface.

In a preferred embodiment, the flow passage switching device further comprises an operating member, the mounting chamber penetrates the valve body, and the mounting chamber comprises a chamber tail disposed on an opposite side of the mounting chamber relative to the opening of the mounting chamber. A second end of the switching shaft extends out of the chamber tail, and the operating member is drivably connected to the second end of the switching shaft.

In a preferred embodiment, the flow passage switching device further comprises a sealing gasket, wherein the sealing gasket is fixedly disposed relative to the valve member, the sealing gasket is provided with at least one first water outlet coupled to the at least one first outflow passage and at least one second water outlet coupled to the at least one second outflow passage, and an outer wall of the switching shaft is connected with the sealing gasket such that the switching shaft is sealed to the sealing gasket.

In order to solve the technical problems, the second technical solution of the present invention is as below:

A flow passage switching device comprises a valve member and a switching shaft. The switching shaft is disposed in the valve member and rotatable relative to the valve member, and the valve member is provided with an inflow passage and at least two outflow passages. The switching shaft is provided with a water dividing chamber connected to the inflow passage. The switching shaft is provided with at least one water dividing hole that penetrates the switching shaft. The switching shaft is switchable to selectively couple the at least two outflow passages with the inflow passage. The valve member comprises a valve body and a valve cover, and the valve body is provided with an inwardly extending mounting chamber. The valve cover is attached to the opening of the mounting chamber such that the valve cover is sealed to the mounting chamber. An end surface of a first end of the switching shaft is provided with an inwardly extending groove, which forms the water dividing chamber. The switching shaft is mounted in the mounting chamber, and an opening of the groove faces the same direction as the opening of the mounting chamber. The inflow passage comprises a water chamber and a water passage. The water chamber is formed between the end surface of the first end of the switching shaft and the valve cover. The water passage is disposed in the valve body and is used to introduce water from outside of the valve body into the water chamber.

In order to solve the technical problems, the third technical solution of the present invention is as below:

A water outlet device comprises a flow passage switching device, a hand-held shower and a head shower. The flow passage switching device comprises a valve member and a switching shaft. The switching shaft is disposed in the valve member and rotatable relative to the valve member. The valve member is provided with an inflow passage and at least three outflow passages. The switching shaft is switchable to selectively couple the at least three outflow passages with the inflow passage. The head shower is provided with at least two water outlet units. The hand-held shower and the at least two water outlet units are respectively connected to the at least three outflow passages.

Compared with the existing techniques, this technical solution has the following advantages:

The switching shaft is provided with the first water dividing hole and the second water dividing hole. By rotating the switching shaft, the first outflow passage can be switched to be coupled with the water dividing chamber through the first water dividing hole, and/or the second outflow passage can be switched to be coupled with the water dividing chamber through the second water dividing hole. In the projection along the rotational axis of the switching shaft, the first water dividing hole and the second water dividing hole are circumferentially arranged around the rotational axis of the switching shaft, and in the projection perpendicular to the rotational axis of the switching shaft, the first water dividing hole and the second water dividing hole are arranged in a direction of the rotational axis of the switching shaft. The layout of the water dividing holes makes the layout design of the outflow passages more flexible, and the structure of the whole flow passage switching device is more compact.

The valve member comprises at least two first outflow passages. The first water dividing hole is coupled with at least two first outflow passages. As one water dividing hole is coupled with at least two outflow passages and the different water dividing holes are coupled with the different outflow passages, the layout is reasonable and the structure is compact.

The valve member comprises a valve body and a valve cover. The valve body is provided with an inwardly extending mounting chamber. The valve cover is fixed to the opening of the mounting chamber such that the valve cover is sealed to the mounting chamber. The end surface of the first end of the switching shaft is provided with an inwardly extending groove, which forms the aforementioned water dividing chamber. The switching shaft is mounted in the mounting chamber, and the opening of the groove faces the same direction as the opening of the mounting chamber. The inflow passage comprises a water chamber and a water passage. The water chamber is formed between the end surface of the first end of the switching shaft and the valve cover. The water passage is disposed in the valve body and is used to introduce water from outside of the valve body into the water chamber. The structure is compact, sealing performance is good because the sealing occurs in the axial direction, and the switching process saves labor and is convenient.

The water outlet device comprises a flow passage switching device, a hand-held shower and a head shower. The valve member is provided with an inflow passage and at least three outflow passages. The switching shaft is switchable to selectively couple at least three outflow passages with the inflow passage. The head shower is provided with at least two water outlet units. The hand-held shower and the at least two water outlet units are respectively connected to the at least three outflow passages. The head shower is provided with at least two kinds of spray patterns. Using the flow passage switching device, not only the hand-held shower and the head shower can be switched, but at least two kinds of spray patterns of the head shower can be switched. The operation is convenient, and the spray patterns become diversified.

The opening of the mounting chamber is provided with an enlarged hole, which forms a step surface. The outer edge of the first end of the switching shaft outwardly extends to form an annular convex portion, and the annular convex portion abuts the step surface. The structure is compact, and assembly is convenient.

The end opening of the water passage is located on the step surface, the structure is compact, and the layout is reasonable.

The mounting chamber penetrates the valve body. The mounting chamber further comprises a chamber tail, which is disposed on an opposite side of the mounting chamber relative to the opening of the mounting chamber. The second end of the switching shaft extends out of the chamber tail, and the operating member is drivably connected to the second end of the switching shaft. The structure is compact, the layout is reasonable, and assembly is convenient.

The sealing gasket is fixedly disposed relative to the valve member, the sealing gasket is provided with at least two first water outlets and a second water outlet, which are respectively coupled to the at least two first outflow passages and the second outflow passage, and the outer wall of the switching shaft contacts the sealing gasket such that the switching shaft is sealed to the sealing gasket. The sealing performance is good and the switching process saves labor and is convenient.

BRIEF DESCRIPTION OF THE DRAWINGS

The present invention will be further described below with the combination of the accompanying drawings together with the embodiments.

DETAILED DESCRIPTION OF THE EMBODIMENTS

Figure 1:
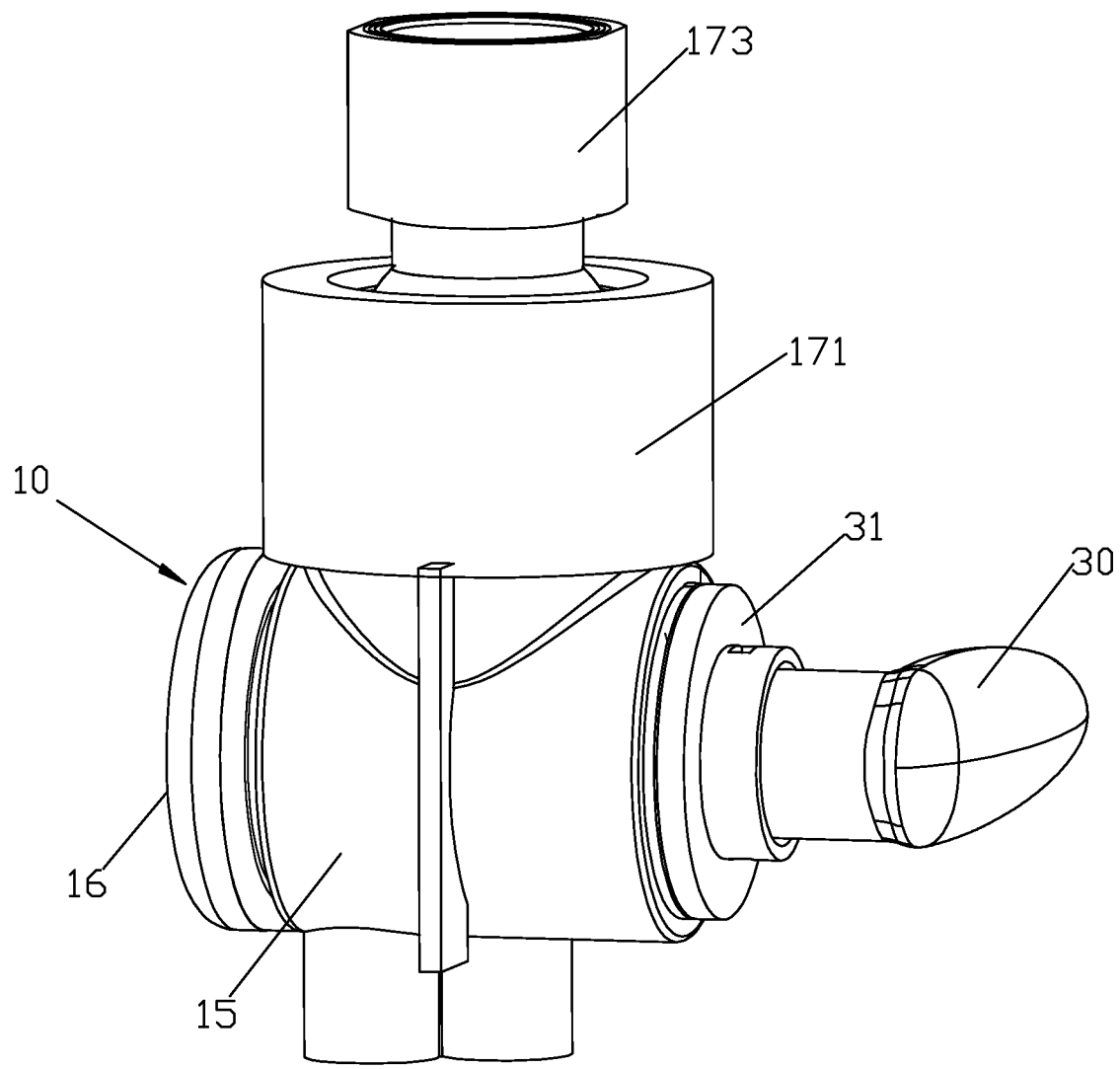
FIG. 1 illustrates a perspective view of the flow passage switching device in the preferred embodiment.
Figure 2:
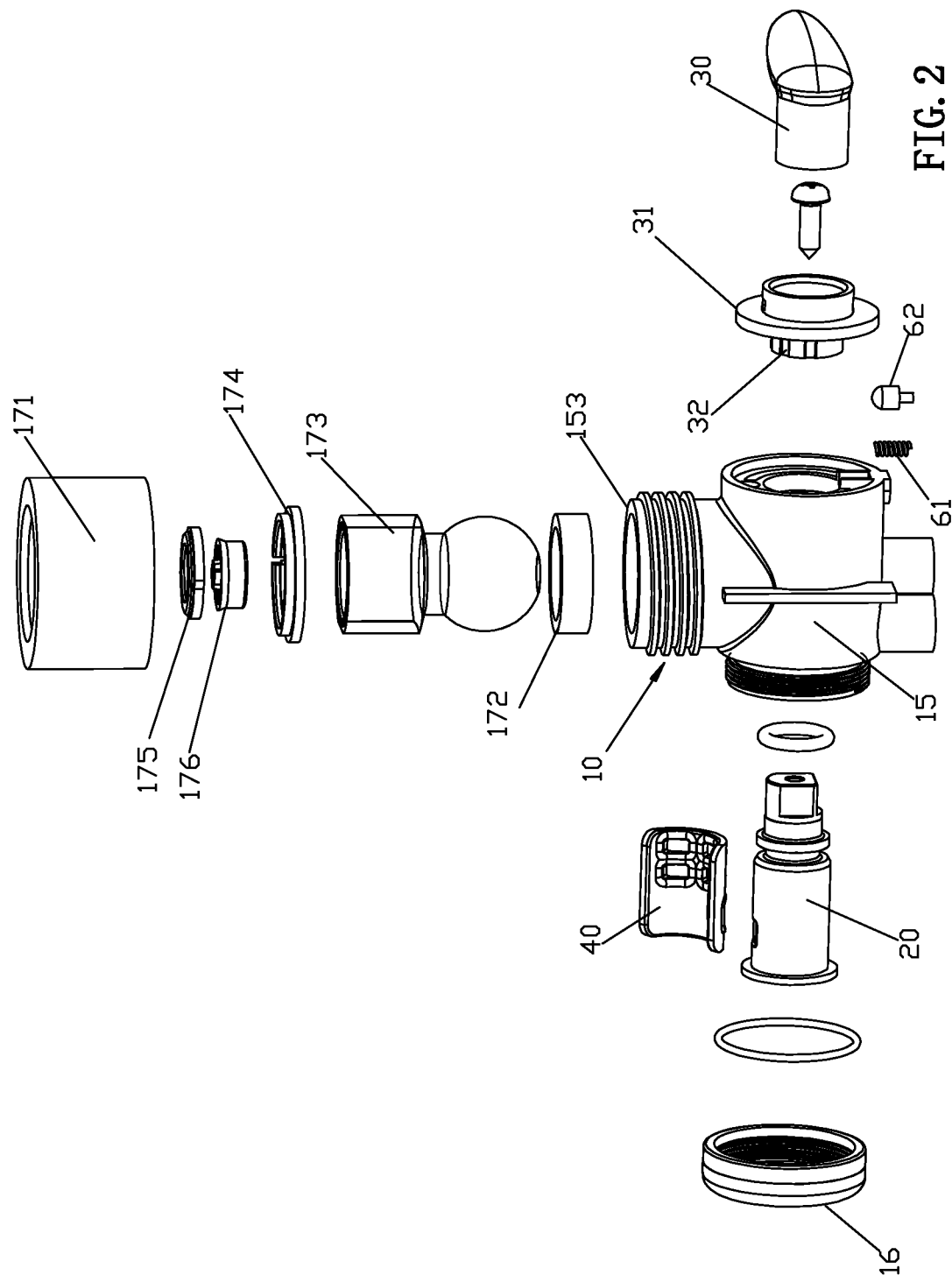
FIG. 2 illustrates an exploded perspective view of the flow passage switching device in the preferred embodiment.
Figure 3:
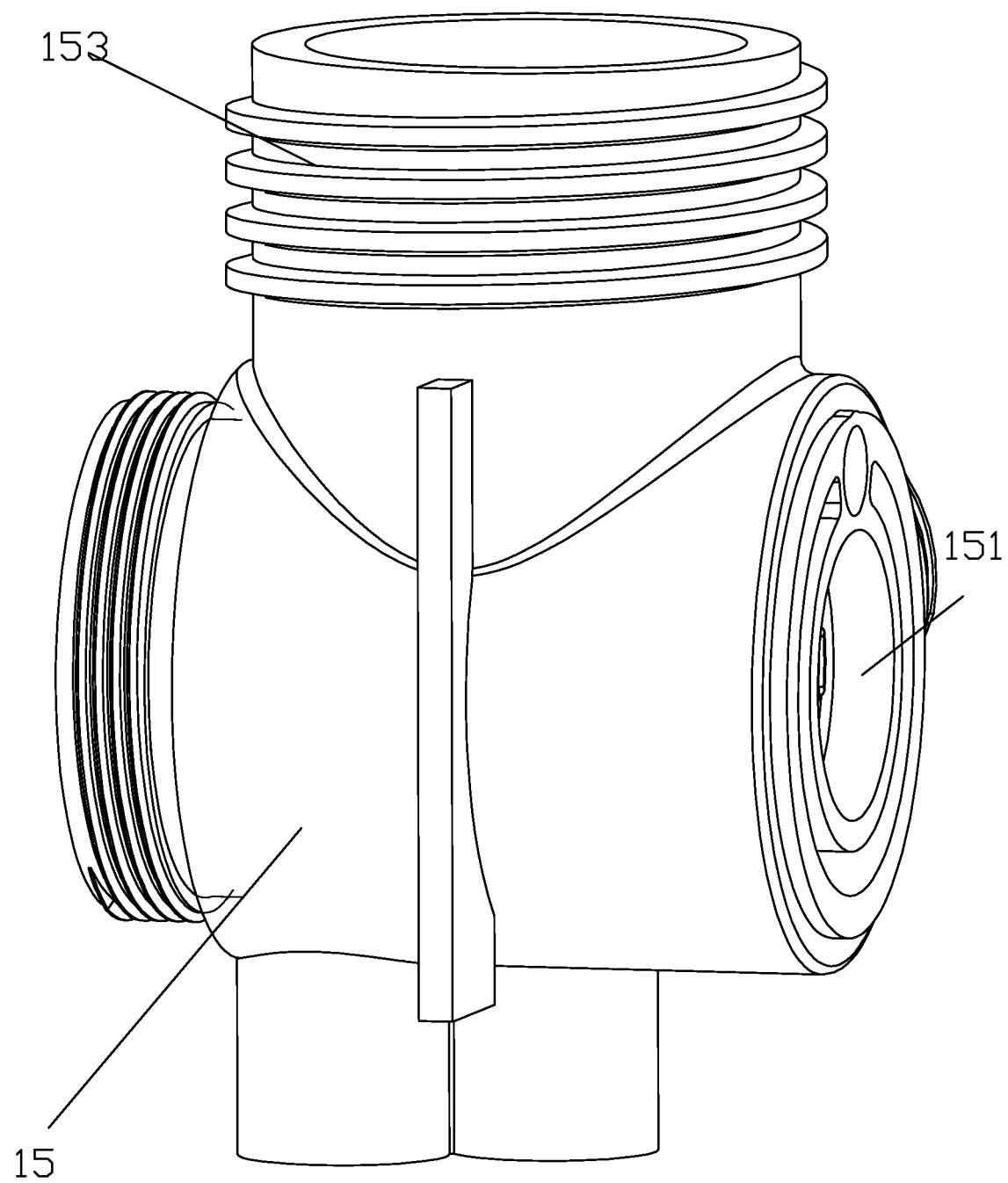
FIG. 3 illustrates a perspective view of the valve body in the preferred embodiment.
Figure 4:
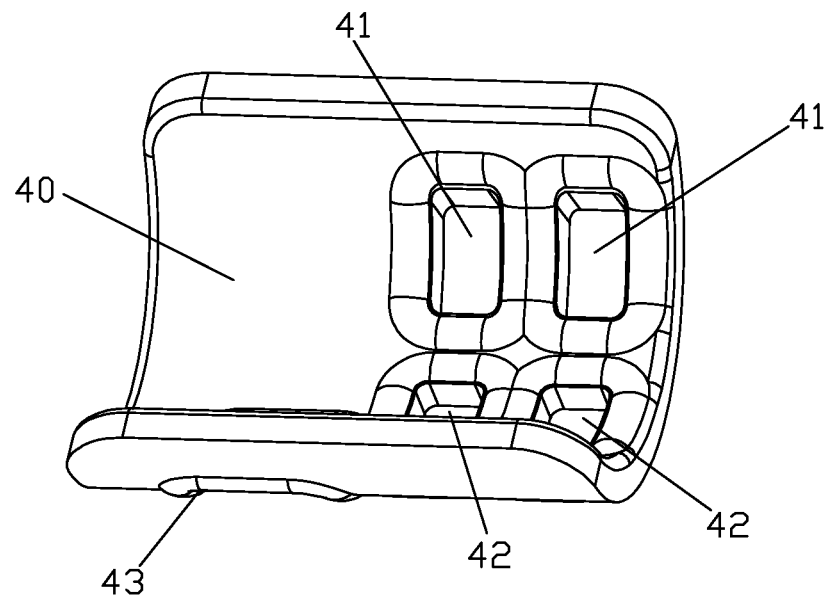
FIG. 4 illustrates a perspective view of the sealing gasket in the preferred embodiment.
Figure 5:
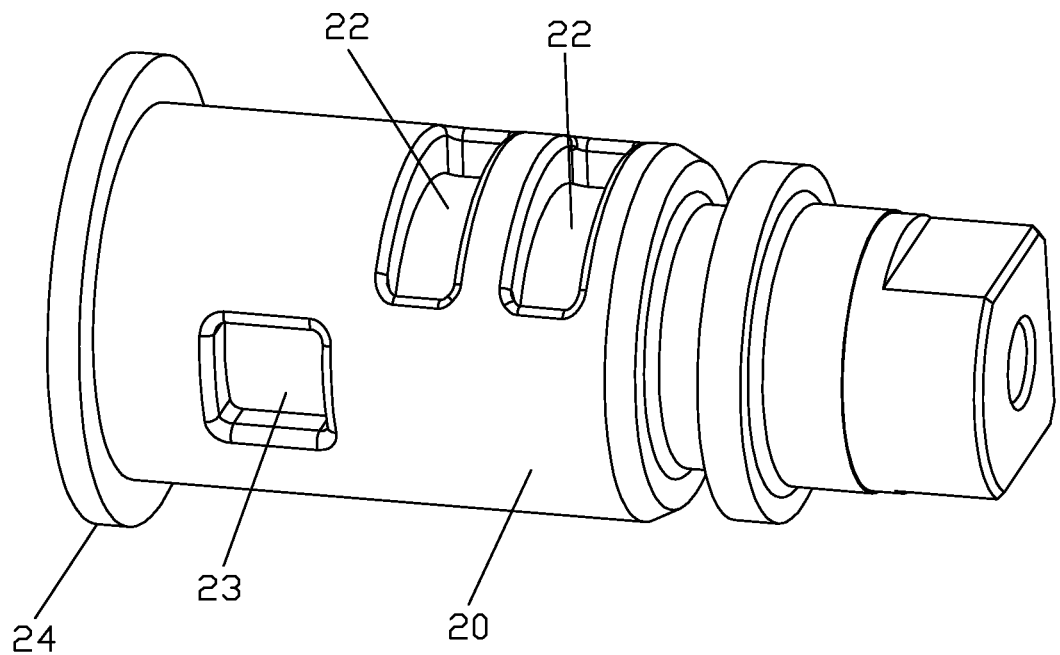
FIG. 5 illustrates a perspective view of the switching shaft in the preferred embodiment.
Figure 6:
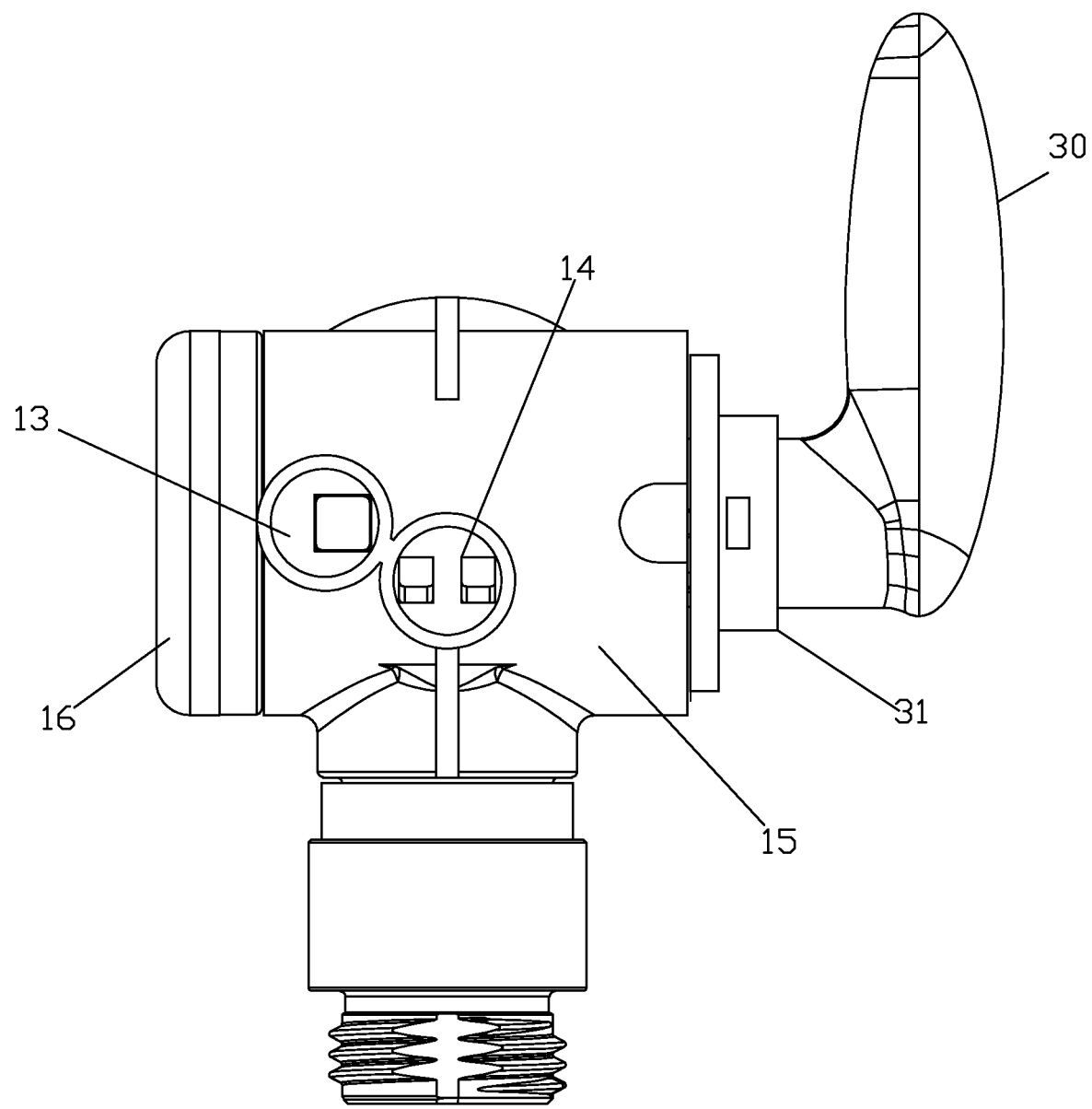
FIG. 6 illustrates a side view of the flow passage switching device in the preferred embodiment.
Figure 7:
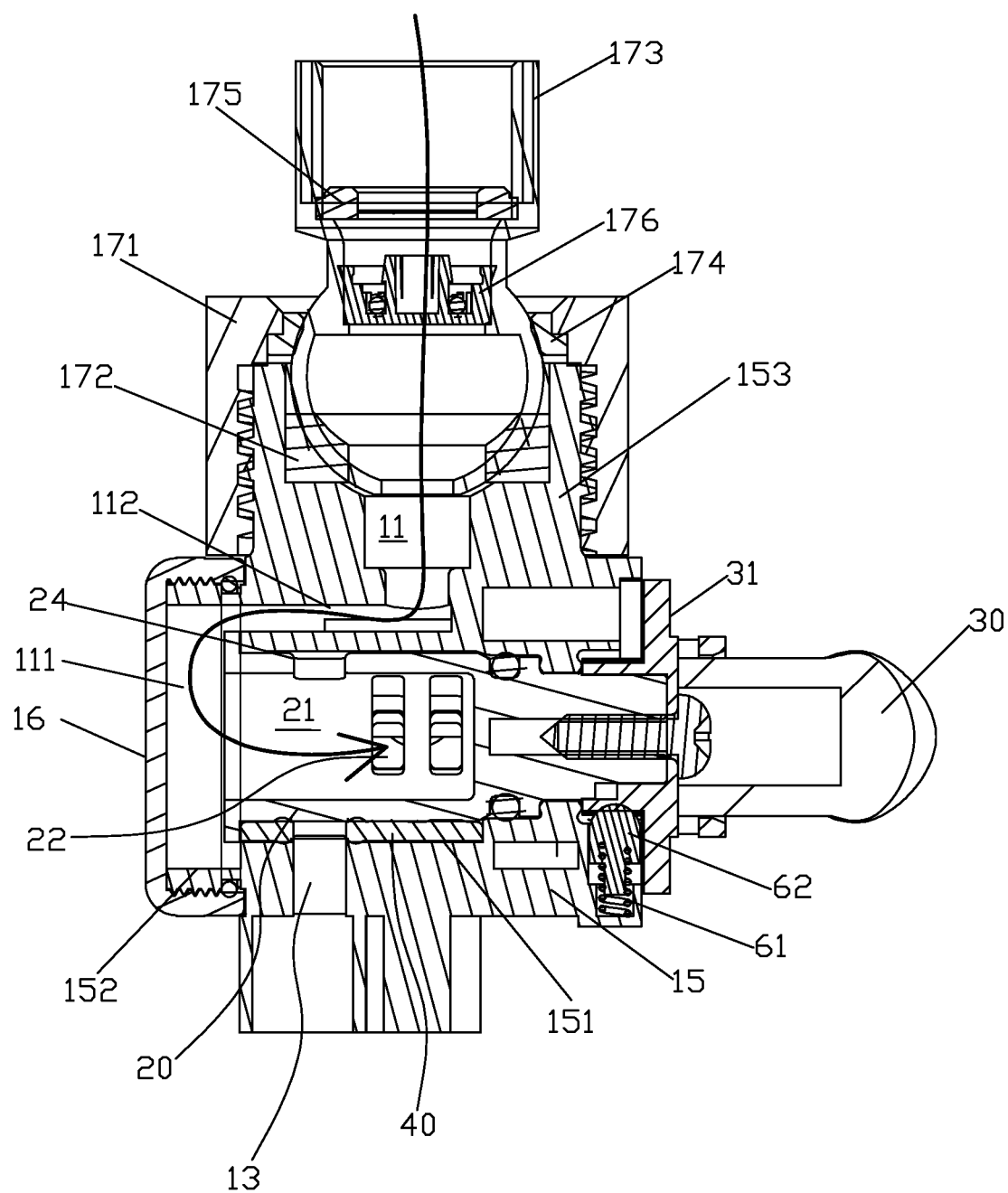
FIG. 7 illustrates a first sectional view of the flow passage switching device in the preferred embodiment. At this time, the flow passage switching device is in a first switching state, and the arrow in the figure shows the direction of the water flow.
Figure 8:
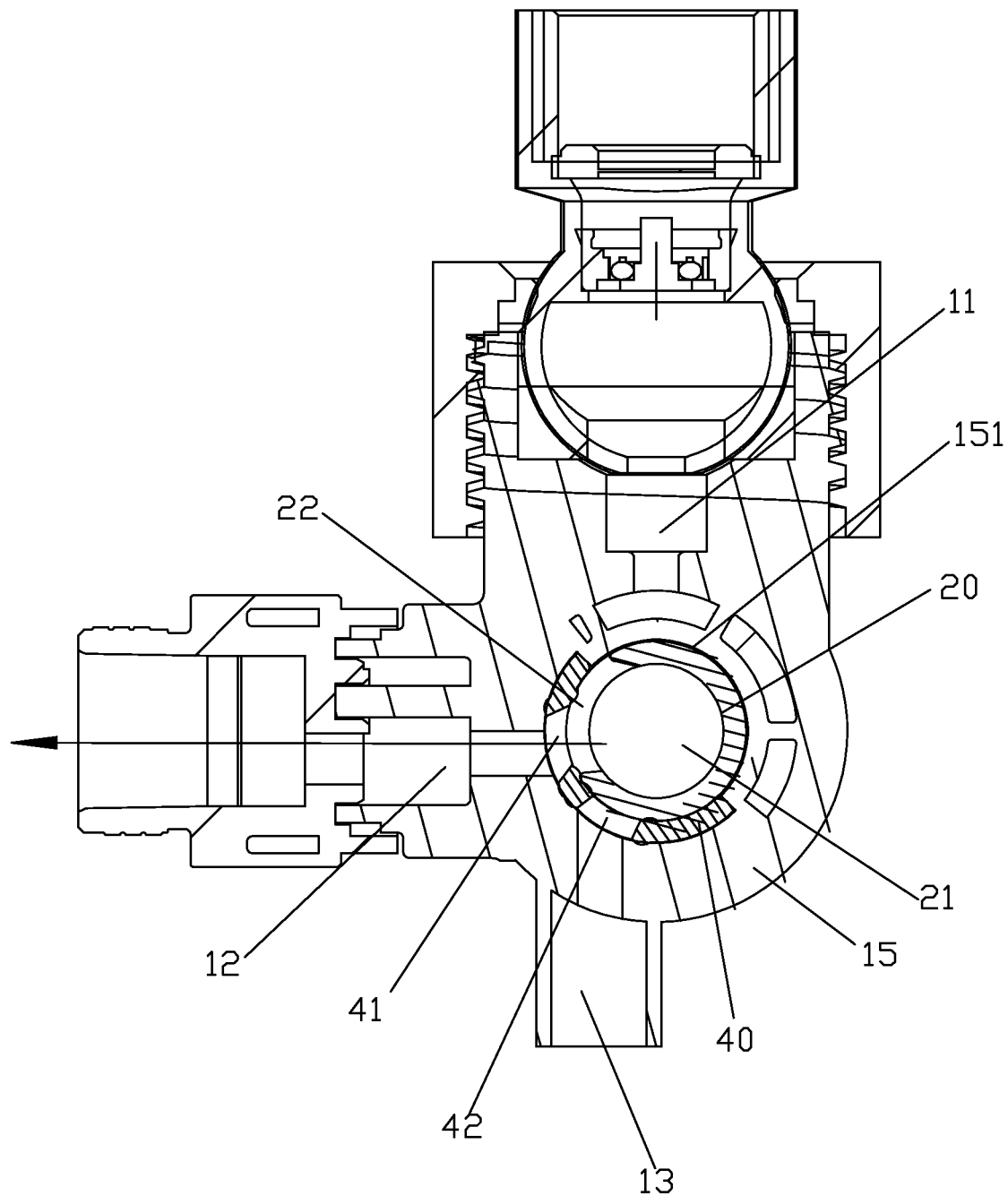
FIG. 8 illustrates a second sectional view of the flow passage switching device in the preferred embodiment. At this time, the flow passage switching device is in the first switching state, and the arrow in the figure shows the direction of the flow.
Figure 9:
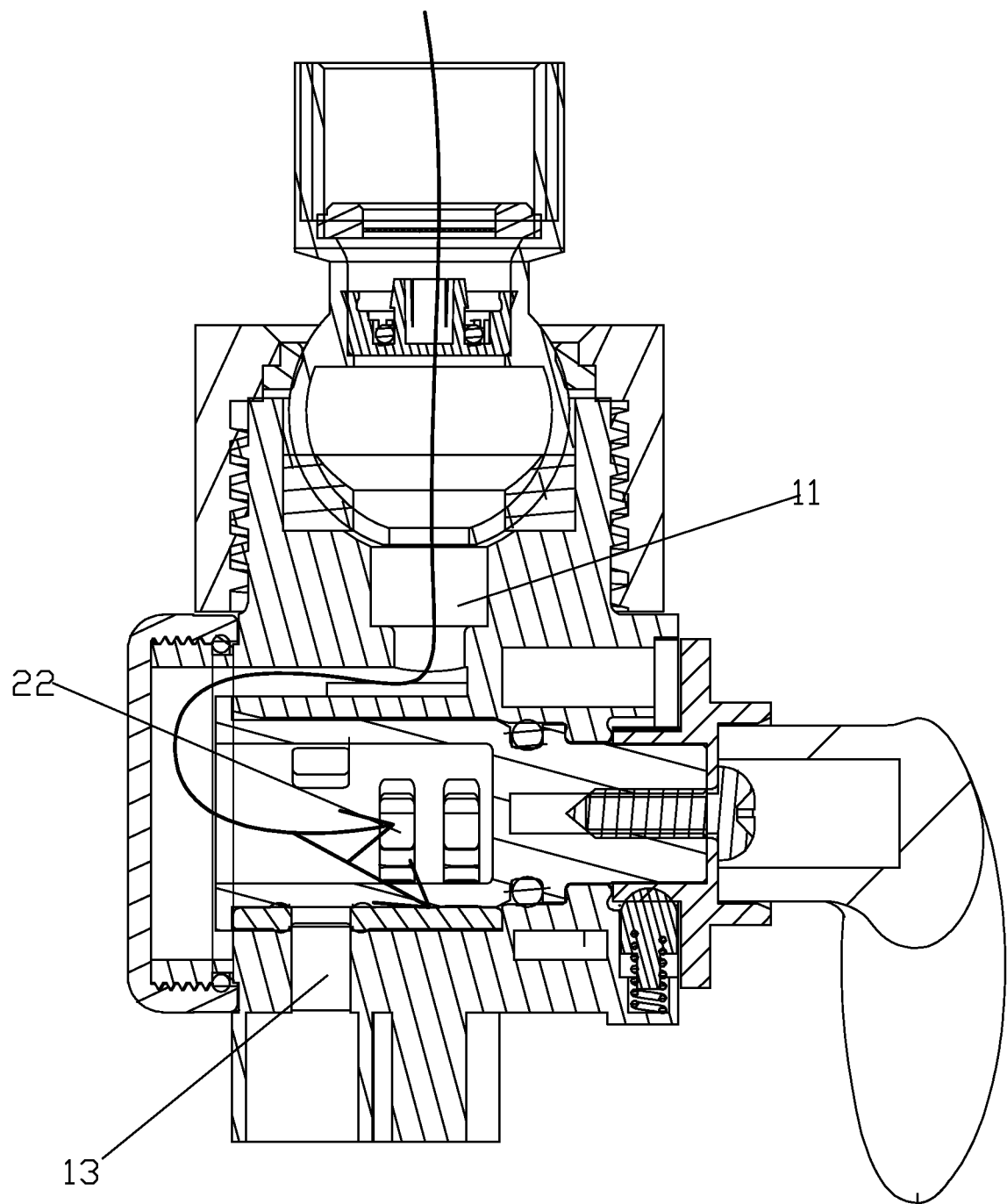
FIG. 9 illustrates the first sectional view of the flow passage switching device in the preferred embodiment. At this time, the flow passage switching device is in a second switching state, and the arrows in the figure show the direction of the water flow.
Figure 10:
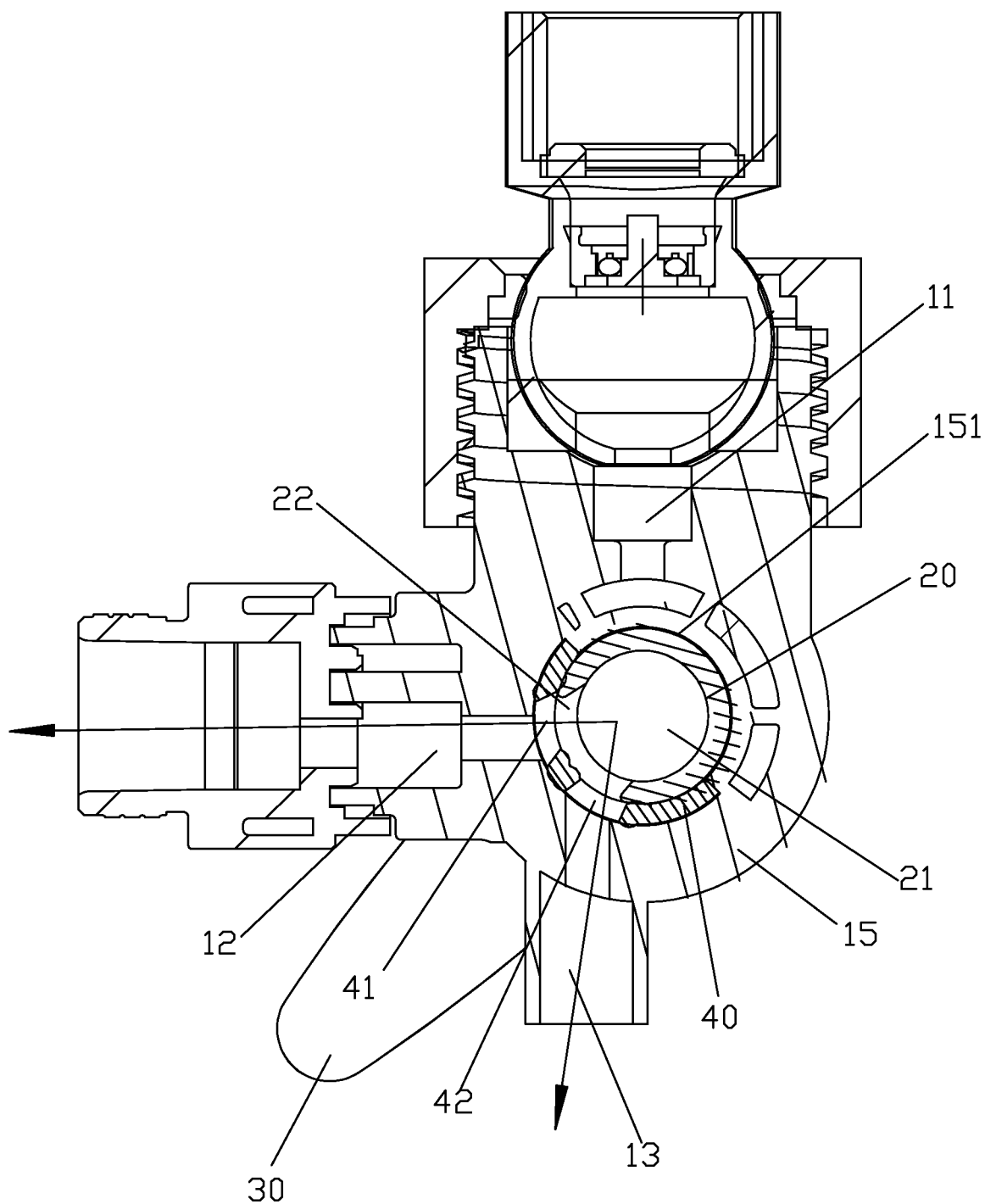
FIG. 10 illustrates the second sectional view of the flow passage switching device in the preferred embodiment. At this time, the flow passage switching device is in the second switching state, and the arrows in the figure show the direction of the water flow.
Figure 11:
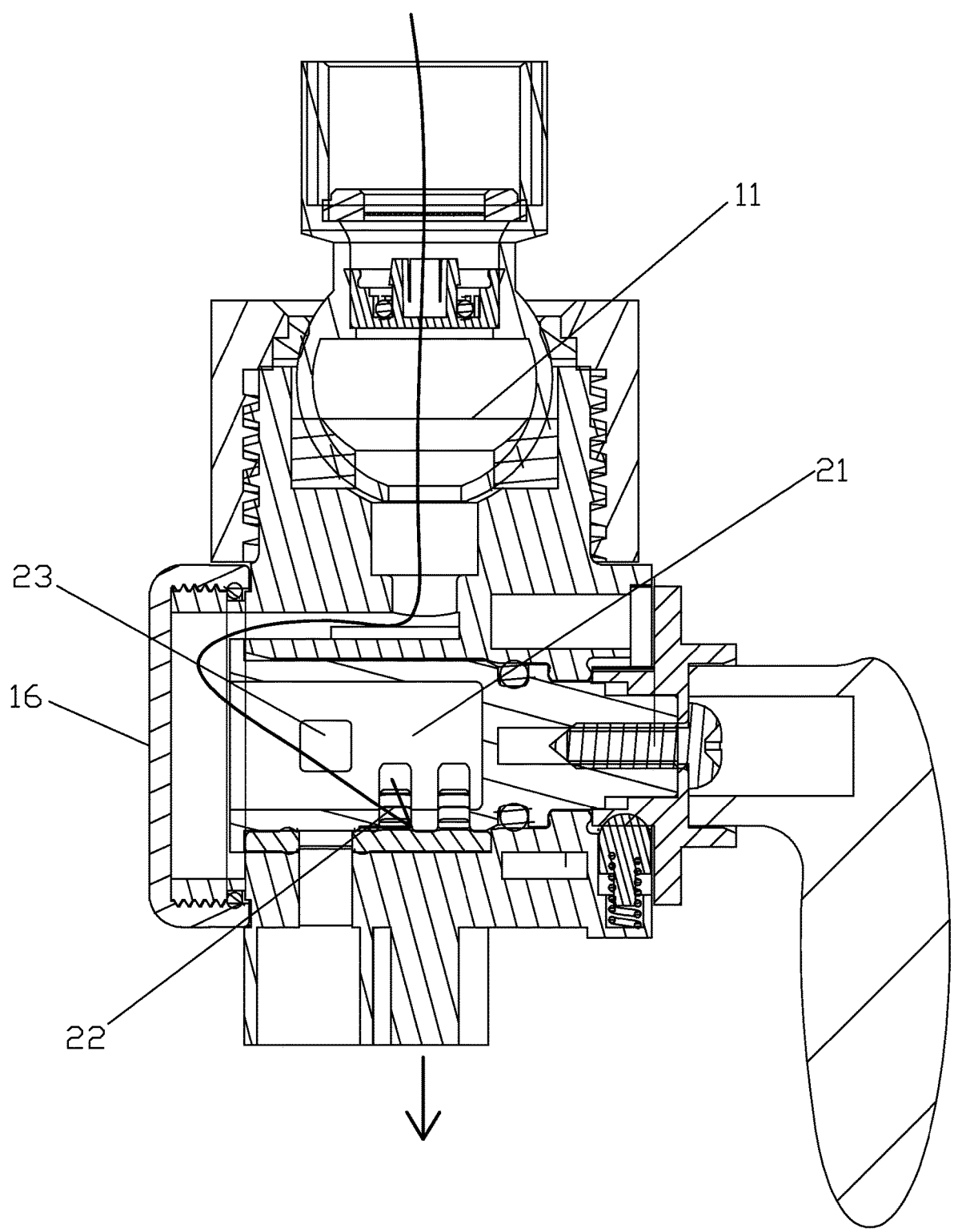
FIG. 11 illustrates the first sectional view of the flow passage switching device in the preferred embodiment. At this time, the flow passage switching device is in a third switching state, and the arrows in the figure show the direction of the water flow.
Figure 12:
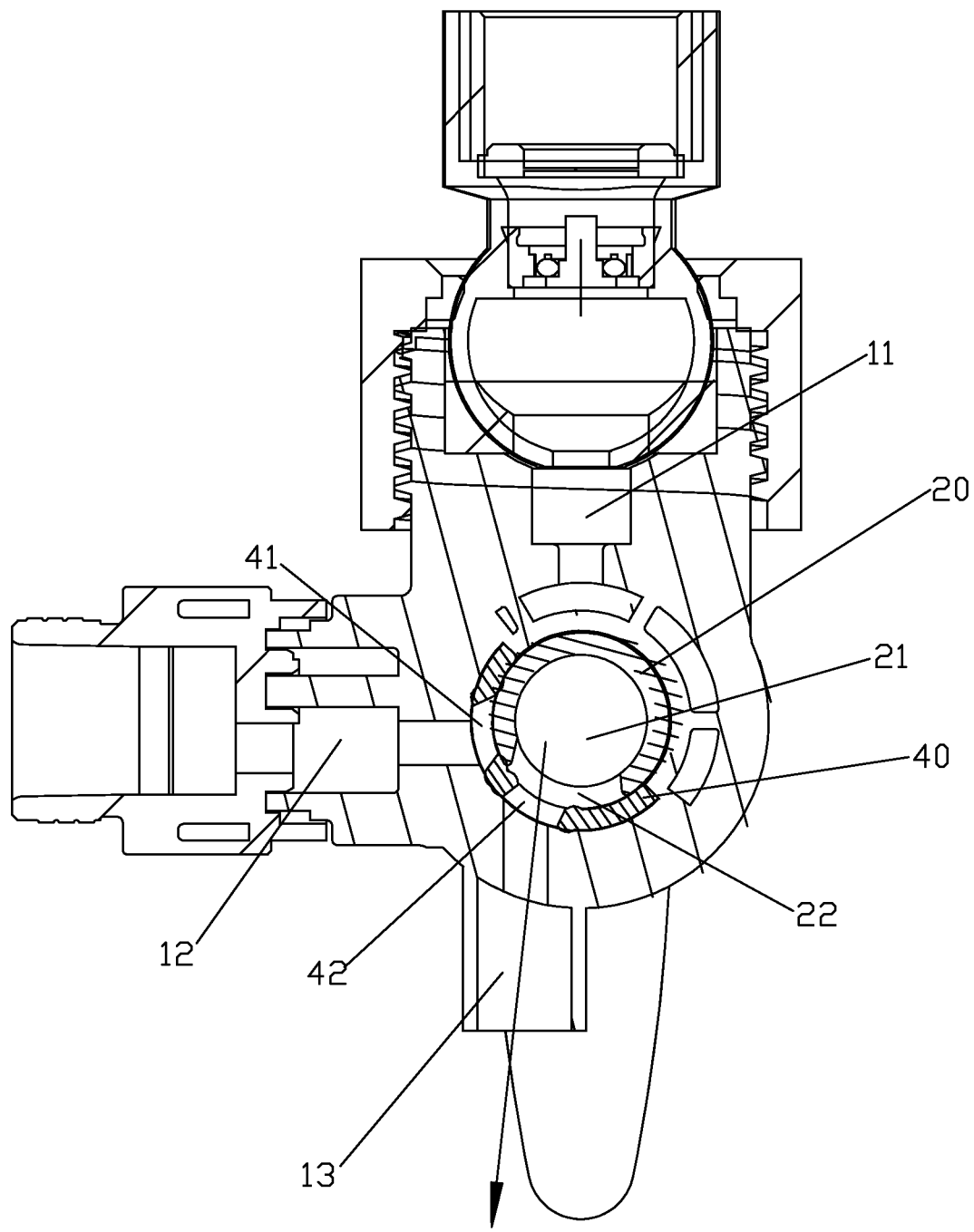
FIG. 12 illustrates the second sectional view of the flow passage switching device in the preferred embodiment. At this time, the flow passage switching device is in the third switching state, and the arrow in the figure shows the direction of the water flow.
Figure 13:
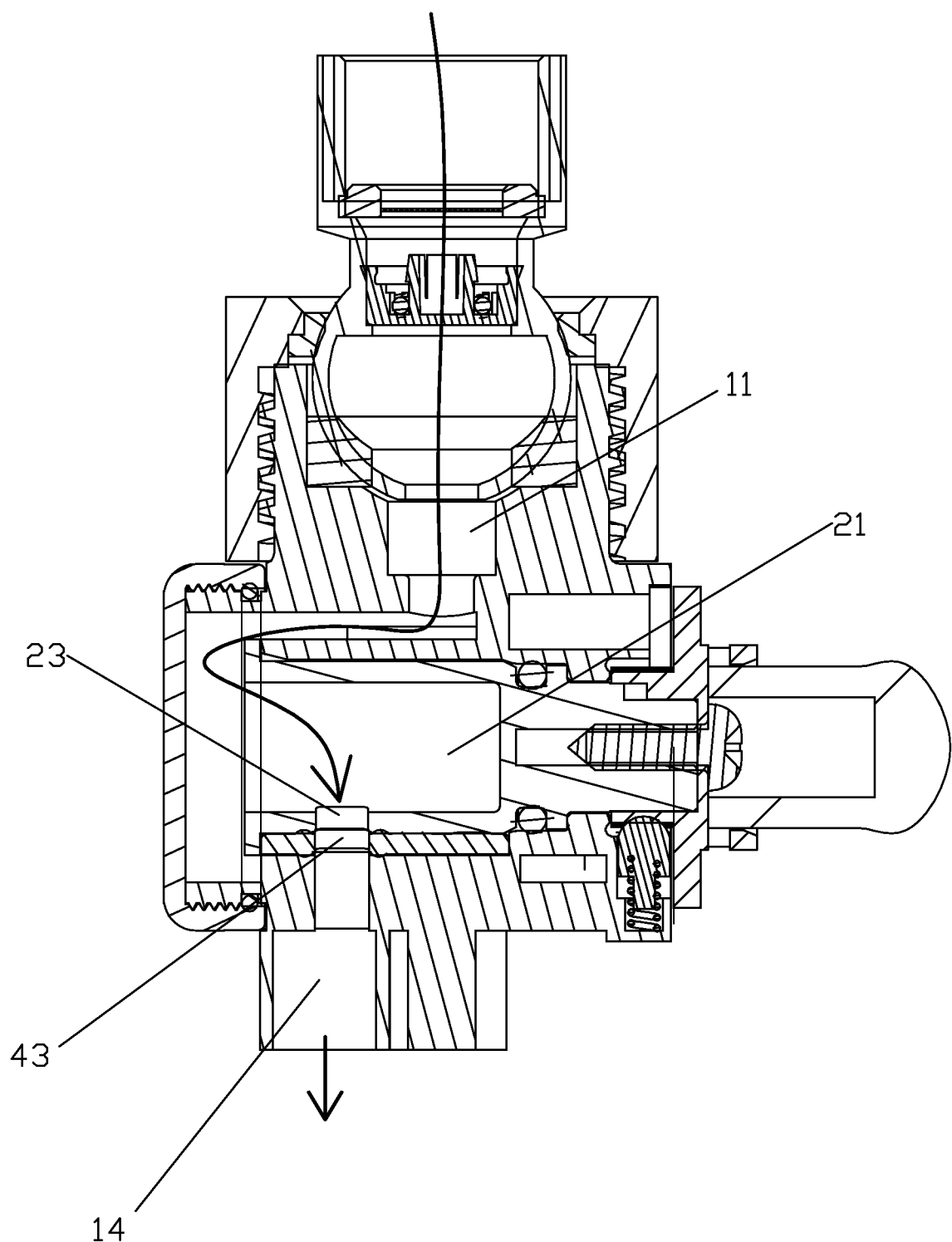
FIG. 13 illustrates the first sectional view of the flow passage switching device in the preferred embodiment. At this time, the flow passage switching device is in a fourth switching state, and the arrows in the figure show the direction of the water flow.
Figure 14:
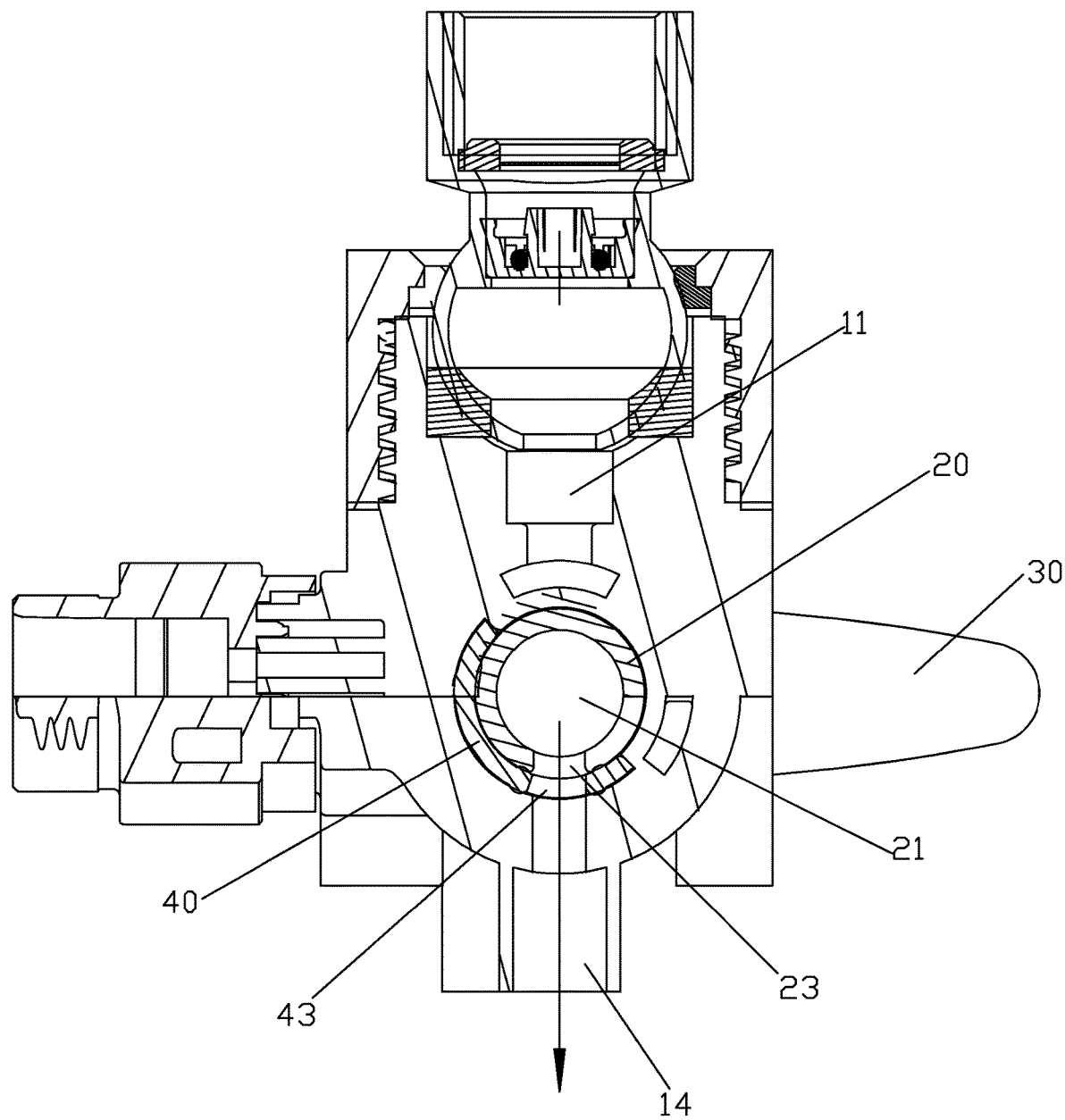
FIG. 14 illustrates the second sectional view of the flow passage switching device in the preferred embodiment. At this time, the flow passage switching device is in the fourth switching state, and the arrow in the figure shows the direction of the water flow.

Referring to FIGS. 1-14, a flow passage switching device comprises a valve member 10, a switching shaft 20 that is disposed in the valve member 10 and rotatable relative to the valve member, and an operating member 30.

The valve member 10 is provided with an inflow passage 11, two first outflow passages 12, 13 and a second outflow passage 14. The switching shaft 20 is provided with a water dividing chamber 21 that is connected to the inflow passage 11. A circumferential wall of the switching shaft 20 is provided with at least one first water dividing hole 22 and a second water dividing hole 23 that penetrate the switching shaft 20. The first water dividing hole 22 and the second water dividing hole 23 are respectively coupled with the first outflow passages 12, 13 and the second outflow passage 14. In the projection along the rotational axis of the switching shaft 20, the first water dividing holes 22 and the second water dividing hole 23 are circumferentially arranged around the rotational axis of the switching shaft 20 at intervals, and in the projection perpendicular to the rotational axis of the switching shaft 20, the first water dividing holes 22 and the second water dividing hole 23 are arranged in the direction of the rotational axis of the switching shaft 20 at intervals. Preferably, there are two first water dividing holes 22. The valve member 10 is provided with the two first outflow passages 12, 13, and the two first water dividing holes 22 are coupled with the two first outflow passages 12, 13. The switching shaft 20 is drivably coupled with the operating member 30 and is driven to rotate relative to the valve member 10 to achieve switching function.

The valve member 10 comprises a valve body 15 and a valve cover 16. The valve body 15 is provided with an inwardly extending mounting chamber 151. The opening of the mounting chamber 151 is provided with an enlarged hole 152, which forms a step surface. The valve cover 16 is attached to the opening of the mounting chamber 151 such that the valve cover is sealed to the mounting chamber. The end surface of the first end of the switching shaft 20 is provided with an inwardly extending groove, which forms the aforementioned water dividing chamber 21. The switching shaft 20 is mounted in the mounting chamber 151, and the opening of the groove faces the same direction as the opening of the mounting chamber 151. The outer edge of the first end of the switching shaft 20 outwardly extends to form an annular convex portion 24, and the annular convex portion 24 abuts the step surface. The inflow passage 11 comprises a water chamber 111 and a water passage 112. The water chamber 111 is formed between the end surface of the first end of the switching shaft 20 and the valve cover 16, and the water passage 112 is disposed in the valve body 15 and is used to introduce water from outside of the valve body 15 into the water chamber 111. The end opening of the water passage 112 is located on the step surface.

Preferably, the flow passage switching device comprises a sealing gasket 40, and the sealing gasket 40 is fixedly attached to an inner wall of the mounting chamber 151. The sealing gasket 40 is fixedly disposed relative to valve member 10. The sealing gasket 40 is provided with first water outlets 41, 42 and a second water outlet 43, which respectively correspond to the first outflow passages 12, 13 and the second outflow passage 14, and the outer wall of the switching shaft 20 contacts the sealing gasket 40 such that the switching shaft 20 is sealed to the sealing gasket 40. The sealing gasket 40 has an arc-shaped structure, and in a preferred embodiment, the arc-shaped structure of the sealing gasket 40 is a cylindrical structure. An axis of the sealing gasket 40 is co-axial with the rotational axis of the switching shaft 20, so that friction can be reduced. The first water outlets 41, 42 are circumferentially arranged at intervals, and in a preferred embodiment, there are two of the first water outlets 41 and two of the first water outlets 42. In the projection along the rotational axis of the switching shaft 20, the second water outlet 43 and the first water outlets 41, 42 are circumferentially arranged at intervals. In the projection perpendicular to the rotational axis of the switching shaft 20, the second water outlet 43 and the first water outlets 41, 42 are arranged in a direction of the rotational axis of the switching shaft at intervals.

In a preferred embodiment, the mounting chamber 151 penetrates the valve body 15. The mounting chamber 151 further comprises a chamber tail, which is disposed on an opposite side of the mounting chamber 151 relative to the opening of the mounting chamber 151. The inner diameter of the chamber tail is smaller than the inner diameter of the mounting chamber 151. The switching shaft 20 is adapted to the structure of the mounting chamber 151 and the chamber tail, and the second end of the switching shaft 20 extends out of the chamber tail. The operating member 30 is drivably connected to the second end of the switching shaft 20, for example, the operating member 30 is fixedly connected to the second end of the switching shaft 20. The operating member 30 is further provided with a positioning block 31. The chamber tail of the mounting chamber 151 is connected and covered with the positioning block 31. The positioning block 31, the operating member 30 and the switching shaft 20 are relatively fixed together. The operating member 30 can be a handle, for example.

According to the needs of users, in order to facilitate switching function and to enhance the feeling of switching to the users, the valve body 15 is further provided with a positioning mechanism, and a plurality of positioning grooves 32 extend inwardly into the positioning block 31. The positioning mechanism comprises a spring 61 and a positioning pin 62 abutted by the spring 61. The positioning pin 62 is adaptable to be inserted into at least one of the positioning grooves 32, and the positioning pin 62 can be inserted into different positioning grooves 32 when the switching shaft 20 is in different switching states.

According to the needs of the users, the flow passage switching device is further provided with an assembly structure, which comprises a nut 171, a spherical gasket 172, a ball head 173 and a bushing 174. The valve body 15 is provided with a connection seat 153. An inner hole of the connection seat 153 is an inlet of a flow passage 112. An outer wall of the connection seat 153 is provided with external threads. The spherical gasket 172 is located in the connection seat 153. A portion of the ball head 173 is assembled in the connection seat 153 and is adaptable to be matched to the spherical gasket 172. The bushing 174 is set outside of the ball head 173. The nut 171 is adaptable to be matched to the bushing 174 and is connected to the connecting seat 153 via a thread connection, so that the ball head 173 and the connecting seat 153 are connected together. Water flow from a water supply source flows into the connection seat 153 through an inner hole of the ball head 173. According to the needs of the users, the inner hole of the ball head 173 can further be provide with a filter gasket 175 and a water restrictor 176.

Figure 15:
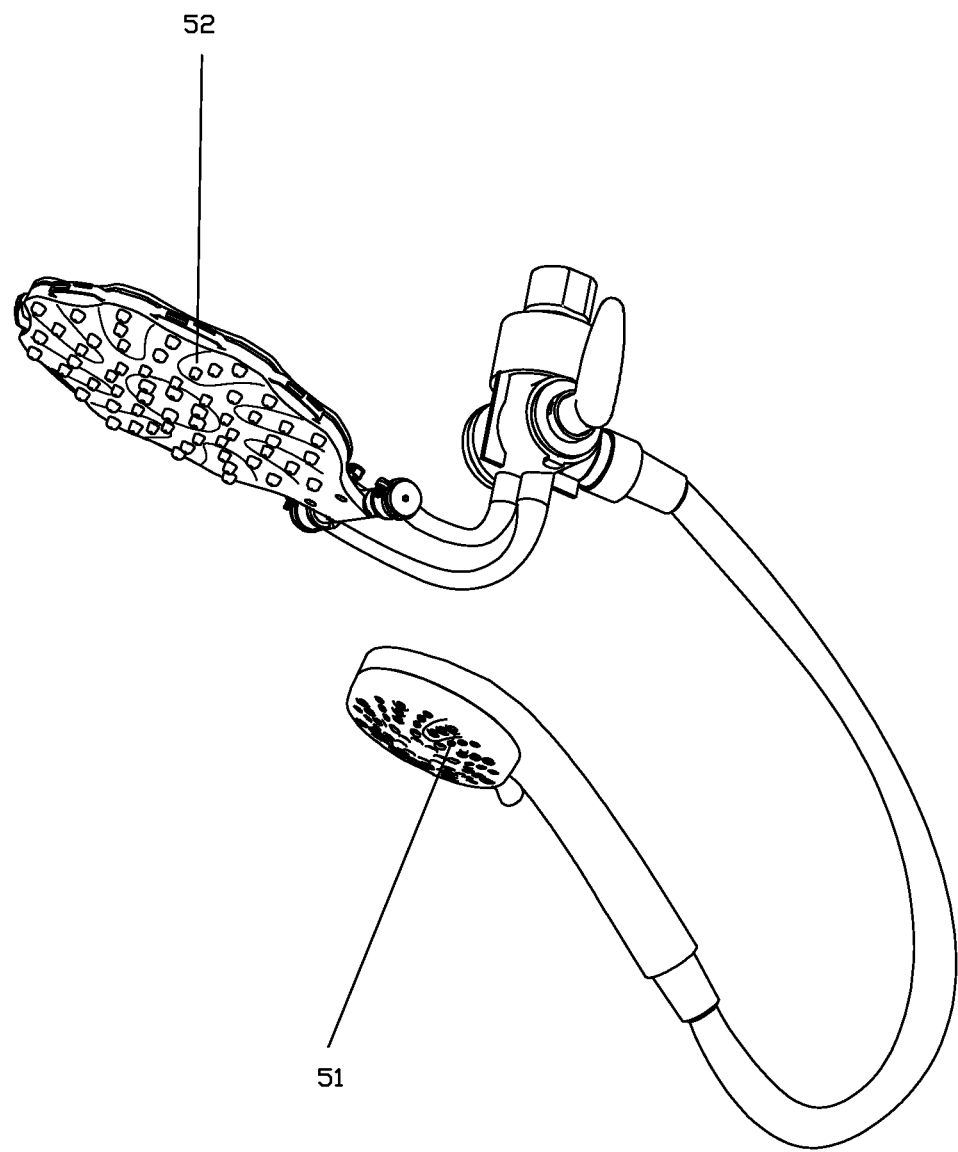
FIG. 15 illustrates a perspective view of the water outlet device in the preferred embodiment.

Referring to FIG. 15, the flow passage switching device of this embodiment can be equipped with a hand-held shower 51 and a head shower 52. The head shower 52 is provided with two water outlet units. The two water outlet units are a first head water outlet unit and a second head water outlet unit (the first head water outlet unit and the second head water outlet unit are respectively provided with different spray patterns). The hand-held shower 51 is connected to the first outflow passage 12, the first head water outlet unit is connected to the first outflow passage 13, and the second head water outlet unit is connected to the second outflow passage 14.

The flow passage switching device in the present embodiment is as follows:

1. In an initial state (e.g. a first switching state), the hand-held shower 51 sprays water. At this time, the first water dividing hole 22 of the switching shaft 20 is coupled with the first outflow passage 12 (an entrance of the hand-held shower) of the valve member 10, so that the hand-held shower 51 sprays water.

2. The operating member is rotated at a predetermined angle (such as 45 degrees). The hand-held shower 51 and the first head water outlet unit spray water at the same time (e.g., a second switching state during which the hand-held shower 51 and the first head water outlet unit spray water at the same time). At this time, the first water dividing hole 22 of the switching shaft 20 is coupled with the two first outflow passages 12, 13 of the valve member 10, and the first head water outlet unit and hand-held shower 51 spray water at the same time, so mixed water is achieved.

3. The operating member is rotated by a predetermined angle, so that the first head water outlet unit sprays water (e.g., a third switching state). At this time, the first water dividing hole 22 of the switching shaft 20 is coupled with the other first outflow passage 13 of the valve member 10, so that the first head water outlet unit sprays water.

4. The operating member is rotated, so that the second head water outlet unit sprays water (e.g., a fourth switching state). At this time, the second water dividing hole 23 of the switching shaft 20 is coupled with the second outflow passage 14 of the valve member 10, so that the second head water outlet unit sprays water.

In this embodiment, there are two of the first water dividing holes. In a projection along a rotational axis of the switching shaft 20, the two first water dividing holes are arranged at the same position, and in a projection perpendicular to the rotational axis of the switching shaft 20, the two first water dividing holes are arranged in the direction of the rotational axis of the switching shaft 20 at intervals. Each of the first outflow passages comprises two first water inlets. In a projection along a rotational axis of the switching shaft 20, the two first water inlets of each first outflow passage are arranged at the same position, and in a projection perpendicular to the rotational axis of the switching shaft 20, the two first water inlets are arranged in the direction of the rotational axis of the switching shaft 20 at intervals. The sealing gasket 40 is also provided with two of the first water outlets 41, 42. A central angle of the first water dividing hole 22 is larger than that of the second water dividing hole 23.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents

What is claimed is:

1. A flow passage switching device, comprising:
a valve member; and
a switching shaft, wherein:
the switching shaft is disposed in the valve member and rotatable relative to the valve member,
the valve member is provided with an inflow passage, at least one first outflow passage, and at least one second outflow passage, the switching shaft is provided with a water dividing chamber connected to the inflow passage,
the switching shaft is provided with at least one first water dividing hole and at least one second water dividing hole that penetrate the switching shaft,
the at least one first water dividing hole is coupled with the at least one first outflow passage and the at least one second water dividing hole is coupled with the at least one second outflow passage,
in a projection along a rotational axis of the switching shaft, the at least one first water dividing hole and the at least one second water dividing hole are circumferentially arranged around the rotational axis of the switching shaft,
in a projection perpendicular to the rotational axis of the switching shaft, the at least one first water dividing hole and the at least one second water dividing hole are arranged in a direction of the rotational axis of the switching shaft,
the valve member comprises a valve body and a valve cover,
the valve body is provided with an inwardly extending mounting chamber,
the valve cover is fixed to an opening of the inwardly extending mounting chamber such that the valve cover is sealed to the inwardly extending mounting chamber,
an end surface of a first end of the switching shaft is provided with an inwardly extending groove, which forms the water dividing chamber,
the switching shaft is mounted in the inwardly extending mounting chamber,
an opening of the inwardly extending groove faces a same direction as the opening of the inwardly extending mounting chamber,
the inflow passage comprises a water chamber and a water passage,
the water chamber is formed between the end surface of the first end of the switching shaft and the valve cover, and
the water passage is disposed in the valve body and is used to introduce water from outside of the valve body into the water chamber.

2. The flow passage switching device according to claim 1, wherein in the projection along the rotational axis of the switching shaft, the at least one first water dividing hole and the at least one second water dividing hole are circumferentially arranged around the rotational axis of the switching shaft at intervals.

3. The flow passage switching device according to claim 2, wherein:
the valve member is provided with at least two of the first outflow passages, and
the at least one first water dividing hole is coupled with the at least two of the first outflow passages.

4. The flow passage switching device according to claim 2, further comprising:
a sealing gasket, wherein:
the sealing gasket is fixedly disposed relative to the valve member,
the sealing gasket is provided with at least one first water outlet coupled to the at least one first outflow passage and at least one second water outlet coupled to the at least one second outflow passage, and
an outer wall of the switching shaft contacts the sealing gasket such that the switching shaft is sealed to the sealing gasket.

5. The flow passage switching device according to claim 1, wherein in the projection perpendicular to the rotational axis of the switching shaft, the at least one first water dividing hole and the at least one second water dividing hole are arranged in the direction of the rotational axis of the switching shaft at intervals.

6. The flow passage switching device according to claim 5, wherein:
the valve member is provided with at least two of the first outflow passages, and
the at least one first water dividing hole is coupled with the at least two of the first outflow passages.

7. The flow passage switching device according to claim 5, further comprising:
a sealing gasket, wherein:
the sealing gasket is fixedly disposed relative to the valve member,
the sealing gasket is provided with at least one first water outlet coupled to the at least one first outflow passage and at least one second water outlet coupled to the at least one second outflow passage, and
an outer wall of the switching shaft contacts the sealing gasket such that the switching shaft is sealed to the sealing gasket.

8. The flow passage switching device according to claim 1, wherein:
the valve member is provided with at least two of the first outflow passages, and
the at least one first water dividing hole is coupled with the at least two of the first outflow passages.

9. The flow passage switching device according to claim 1, further comprising:
an operating member, wherein the switching shaft is drivably coupled with the operating member.

10. The flow passage switching device according to claim 9, further comprising:
a sealing gasket, wherein:
the sealing gasket is fixedly disposed relative to the valve member,
the sealing gasket is provided with at least one first water outlet coupled to the at least one first outflow passage and at least one second water outlet coupled to the at least one second outflow passage, and
an outer wall of the switching shaft contacts the sealing gasket such that the switching shaft is sealed to the sealing gasket.

11. The flow passage switching device according to claim 1, wherein:
the opening of the inwardly extending mounting chamber is provided with an enlarged hole, which forms a step surface,
an outer edge of the first end of the switching shaft outwardly extends to form an annular convex portion, and
the annular convex portion abuts the step surface.

12. The flow passage switching device according to claim 11, wherein an end opening of the water passage is located on the step surface.

13. The flow passage switching device according to claim 1, further comprising:
an operating member, wherein:
the inwardly extending mounting chamber penetrates the valve body,
the inwardly extending mounting chamber comprises a chamber tail disposed on an opposite side of the inwardly extending mounting chamber relative to the opening of the inwardly extending mounting chamber, a second end of the switching shaft extends out of the chamber tail, and the operating member is drivably connected to the second end of the switching shaft.

14. The flow passage switching device according to claim 1, further comprising:

a sealing gasket, wherein:

the sealing gasket is fixedly disposed relative to the valve member, the sealing gasket is provided with at least one first water outlet coupled to the at least one first outflow passage and at least one second water outlet coupled to the at least one second outflow passage, and an outer wall of the switching shaft contacts the sealing gasket such that the switching shaft is sealed to the sealing gasket.

* * * * *